(12) United States Patent
Gozzini

(10) Patent No.: US 8,115,497 B2
(45) Date of Patent: Feb. 14, 2012

(54) PIXEL SENSING CIRCUIT WITH COMMON MODE CANCELLATION

(75) Inventor: Giovanni Gozzini, Berkeley, CA (US)

(73) Assignee: Authentec, Inc., Melbourne, FL (US)

( * ) Notice: Subject to any disclaimer, the term of this patent is extended or adjusted under 35 U.S.C. 154(b) by 533 days.

(21) Appl. No.: 12/268,950

(22) Filed: Nov. 11, 2008

(65) Prior Publication Data
US 2009/0123039 A1 May 14, 2009

Related U.S. Application Data

(60) Provisional application No. 60/987,739, filed on Nov. 13, 2007.

(51) Int. Cl.
*G01R 27/26* (2006.01)
(52) U.S. Cl. .......................... 324/661; 324/683
(58) Field of Classification Search .............. 324/661, 324/662; 382/124
See application file for complete search history.

(56) References Cited

U.S. PATENT DOCUMENTS

| | | | |
|---|---|---|---|
| 3,493,855 A * | 2/1970 | Norwich | 324/664 |
| 3,641,431 A | 2/1972 | Pigage et al. | |
| 3,781,855 A | 12/1973 | Killen | |
| 3,873,927 A | 3/1975 | Overall | |
| 3,967,310 A | 6/1976 | Horiuchi et al. | |
| 4,016,490 A | 4/1977 | Weckenmann et al. | |
| 4,096,758 A | 6/1978 | Moore | |
| 4,161,743 A | 7/1979 | Ajima et al. | |
| 4,183,060 A | 1/1980 | Barnette et al. | |
| 4,353,056 A | 10/1982 | Tsikos | |
| 4,394,773 A | 7/1983 | Ruell | |
| 4,428,670 A | 1/1984 | Ruell et al. | |
| 4,429,413 A | 1/1984 | Edwards | |
| 4,513,298 A | 4/1985 | Scheu | |
| 4,547,898 A | 10/1985 | Tsikos | |
| 4,571,543 A | 2/1986 | Raymone et al. | |
| 4,577,345 A | 3/1986 | Abramov | |
| 4,626,774 A | 12/1986 | Regtien | |
| 4,641,350 A | 2/1987 | Bunn | |
| 4,656,871 A | 4/1987 | Czarnocki | |
| 4,686,531 A | 8/1987 | Shambroom et al. | |
| 4,743,837 A | 5/1988 | Herzog | |

(Continued)

FOREIGN PATENT DOCUMENTS

EP 0 343 580 A2 11/1989

(Continued)

OTHER PUBLICATIONS

Wolffenbuttel et al., "Integrated Tactile Imager With An Intrinsic Contour Detection Option," Sensors and Actuators, 16:141-153, 1989.

(Continued)

*Primary Examiner* — Vincent Q Nguyen
(74) *Attorney, Agent, or Firm* — Allen, Dyer, Doppelt, Milbrath & Gilchrist, P.A.

(57) ABSTRACT

An improved biometric data sensing circuit, for example adapted for fingerprint sensing, uses a charge subtraction technique at the input of the circuit integrator to cancel the so called "common mode" signal from the circuit output. The result is an output signal that is (a) linear, (b) free from any amplification effect due to the presence of the detected object (e.g. a finger), and (c) indicative of the detected object's fine surface geometry (i.e., indicative of the fingerprint's ridges and valleys).

5 Claims, 3 Drawing Sheets

U.S. PATENT DOCUMENTS

| | | | |
|---|---|---|---|
| 4,763,063 | A | 8/1988 | Shkedi |
| 4,814,691 | A | 3/1989 | Garbini et al. |
| 4,935,207 | A | 6/1990 | Stanbro et al. |
| 4,958,129 | A | 9/1990 | Poduje et al. |
| 5,028,876 | A | 7/1991 | Cadwell |
| 5,325,442 | A | 6/1994 | Knapp |
| 5,373,181 | A | 12/1994 | Scheiter et al. |
| 5,430,381 | A | 7/1995 | Dower |
| 5,467,022 | A | 11/1995 | Aoki et al. |
| 5,493,621 | A | 2/1996 | Matsumura |
| 5,530,581 | A | 6/1996 | Cogan |
| 5,613,014 | A | 3/1997 | Eshera et al. |
| 5,659,626 | A | 8/1997 | Ort et al. |
| 5,767,686 | A | 6/1998 | Kespohl |
| 5,778,089 | A | 7/1998 | Borza |
| 5,825,907 | A | 10/1998 | Russo |
| 5,828,773 | A | 10/1998 | Setlak et al. |
| 5,841,888 | A | 11/1998 | Setlak et al. |
| 5,844,415 | A | 12/1998 | Gershenfeld et al. |
| 5,845,005 | A | 12/1998 | Setlak et al. |
| 5,852,670 | A | 12/1998 | Setlak et al. |
| 5,862,248 | A | 1/1999 | Salatino et al. |
| 5,869,791 | A | 2/1999 | Young |
| 5,903,225 | A | 5/1999 | Schmitt et al. |
| 5,920,640 | A | 7/1999 | Salatino et al. |
| 5,936,412 | A | 8/1999 | Gershenfeld et al. |
| 5,953,441 | A | 9/1999 | Setlak |
| 5,973,623 | A | 10/1999 | Gupta et al. |
| 6,011,859 | A | 1/2000 | Kalnitsky et al. |
| 6,025,726 | A | 2/2000 | Gershenfeld et al. |
| 6,051,981 | A | 4/2000 | Gershenfeld et al. |
| 6,066,954 | A | 5/2000 | Gershenfeld et al. |
| 6,088,471 | A | 7/2000 | Setlak et al. |
| 6,091,082 | A | 7/2000 | Thomas et al. |
| 6,114,862 | A | 9/2000 | Tartagni et al. |
| 6,191,593 | B1 | 2/2001 | Tartagni et al. |
| 6,236,741 | B1 | 5/2001 | Kovacs-Vajna |
| 6,256,022 | B1 * | 7/2001 | Manaresi et al. ............ 345/174 |
| 6,512,381 | B2 | 1/2003 | Kramer |

FOREIGN PATENT DOCUMENTS

| | | |
|---|---|---|
| EP | 0 455 070 A1 | 5/1990 |
| EP | 0 397 244 A2 | 11/1990 |
| EP | 0 454 883 A1 | 11/1991 |
| EP | 0 710 593 A1 | 10/1995 |
| EP | 0 779 497 A2 | 6/1997 |
| EP | 0 786 745 A2 | 7/1997 |
| EP | 0 790 479 A1 | 8/1997 |
| EP | 0 791 899 A2 | 8/1997 |
| EP | 1772702 | 4/2007 |
| GB | 2279756 | 1/1995 |
| GB | 2279757 | 1/1995 |
| GB | 2312514 | 10/1997 |
| JP | 2003078365 A * | 3/2003 |
| JP | 2000346608 | 12/2007 |
| WO | WO 97/40744 | 11/1997 |
| WO | WO 98/49691 | 11/1998 |
| WO | WO 99/28701 | 6/1999 |

OTHER PUBLICATIONS

Sarma et al., "Capacitance-Type Blade-Tip Clearance Measurement System Using a Dual Amplifier with Ramp/DC Inputs and Integration," IEEE Transactions on Instrumentation and Measurement 41(5):674-678, Oct. 1992.

Young et al., "Novel Fingerprint Scanning Arrays Using Polysilicon TFT's on Glass and Polymer Substrates," IEEE Electron Device Letters, 8(1).19-20, 1997.

Tartagni et al., "A 390dpi Live Fingerprint Imager Based on Feedback Capacitive Sensing Scheme," IEEE International Solid-State Circuits Conference, Feb. 7. 1997, 5 pp.

* cited by examiner

PIXEL SENSING CIRCUIT WITH COMMON MODE CANCELLATION

CROSS-REFERENCE TO RELATED APPLICATIONS

The present disclosure is related to and claims priority from copending U.S. Provisional Patent Application, Ser. No. 60/987,739, filed on Nov. 13, 2007, and further which, in its entirety, is hereby incorporated herein by reference.

BACKGROUND OF THE INVENTION

1. Field of the Invention

The present invention relates to biometric data (e.g., fingerprint) sensing circuitry, and more particularly to a circuit and method for improving dynamic range in such circuitry.

2. Description of the Prior Art

Capacitive biometric data sensing circuits (also referred to as pixels) are well known. Such a circuit is shown and described in U.S. Pat. No. 6,512,381, incorporated herein by reference. More specifically, with reference to FIG. 1 hereof, there is shown a schematic illustration of a circuit for 10 biometric data sensing. FIG. 2 is an illustration of a device 20 implementing the circuit 10 of FIG. 1.

A common application of such circuits is imaging of a user's fingerprint pattern found on the tip of one of the user's fingers, for example for user identity verification. Such circuits sense field changes due in part to proximity of the finger of the user. These circuits are very sensitive, and are in fact able to detect, for example, differences in field strength in the presence of a peak of a fingerprint and field strength in the presence of a valley of a fingerprint on a pixel-by-pixel basis. For the circuit 10 of FIG. 1, in terms of the sensing capacitance, $C_{sense}$, at capacitor 12, $$C_{sense} = \begin{cases} C_{S0} \text{ in absence of a fingerprint ridge} \\ C_{S0}(1-\alpha) \text{ in presence of a fingerprint ridge } (\alpha \text{ typ. approx. } 0.1) \end{cases}$$

In terms of the voltages at the input node 14 and output node 16 of the circuit, $$|\Delta V_{out}| = |\Delta V_{in}| \cdot \frac{C_{in}}{C_{sense}} \quad (1)$$

Thus, the difference in output voltages between pixels can be used to generate a local image of the user's fingerprint.

The output of a typical sensing circuit is comprised of a "differential mode" (that portion of the output signal of interest, commonly referred to as data), a "common mode" (base data present in each pixel regardless of the presence of a finger), and noise, attributable to many source such as the design of the circuit itself, the environment in which the circuit is operated, etc. FIG. 3 illustrates a graph of the output voltage from a pixel as a ridge of a fingerprint passes over the pixel, showing differential and common modes (noise is omitted for clarity), for two respective pixels. A description of the timing of the various signals is beyond the scope of the present disclosure. If at the pixel location $p_1$ a valley of a fingerprint is present over the sensing circuit, the output voltage from the pixel is $V_1$. If at the pixel location $p_2$ a ridge of a fingerprint is present, the output voltage is $V_2$. It is the difference between $V_1$ and $V_2$ ($\Delta V$) that is of interest. Thus, at the limit $V_1$ can be considered the "common mode" (although in certain embodiments, a voltage measured in the absence of a finger may be considered the "common mode.")

At present, the common mode may account for as much as 90% of the pixel output signal, with a mere 10% of that output signal representing data (the information needed to construct a biometric image such as a fingerprint). As the ratio of data (signal) to noise decreases in an output, the difficulty in accurately determining data in that output increases. It is a goal of circuit design to minimize the common mode so that the data is more easily and accurately recognized.

Commonly in the prior art, gain and offset adjustments are made to compensate in part for the common mode signal. However, adjusting the gain and offset affect not only the undesired "common mode" signal, but also the desired data (signal). Thus in the prior art, the output dynamics of the sensing circuit are not used efficiently to reflect the presence of surface modulations, i.e., the fingerprint features.

Compounding this poor signal-to-noise problem is a decrease in typical operating voltage for fingerprint sensors (driven, for example, by the desire to increase battery life in portable devices using such fingerprint sensors). Circuits of the type illustrated in FIG. 1 have typically been operated at 5 volts. This has provided acceptable dynamic range for sensing. Dynamic range is the greatest possible range of output signals, taking away the noise or common mode. Basically, dynamic range is the difference between an output signal in the presence of a ridge and in the presence of a valley. However, there is a trend to design biometric sensing circuits to operate at 3 volts or lower. In doing so, the dynamic range is compressed. That is, the actual voltage representing the data decreases to a point that it is difficult to detect, especially as compared to the voltage representing the common mode. Thus, as dynamic range is compressed, the noise portion of the pixel output dominates the data, and generation of a biometric image (e.g., fingerprint) becomes more difficult and less accurate (if possible at all).

SUMMARY OF THE INVENTION

Accordingly, there is a need in the art to provide a method of boosting dynamic range within the constraints of pixel design. We have developed a technique, disclosed herein, for accomplished by removing the common mode from pixels in an array, leaving as output from those pixels the data of interest.

The output of the present invention is an electronic signal that indicates the fine surface features of the detected object (e.g., an image of a fingerprint pattern). Using a charge subtraction technique at the input of the circuit integrator, the so called "common mode" signal is subtracted from the circuit output. The result is an output signal that is (a) linear, (b) free from any amplification effect due to the presence of the detected object (e.g., a finger), and (c) indicative of the detected object's fine surface geometry (e.g., indicative of the fingerprint's ridges and valleys). With the common mode signal effectively removed from the output, the circuit makes better use of the available output dynamics of the sensing pixel circuit compared to the prior art. This can improve the signal-to-noise ratio (SNR) of the pixel circuit, as well as enable low power pixel circuit implementations.

According to one aspect of the present invention, a difference circuit is provided permitting mathematical cancelling of the common mode. In a specific embodiment of the present invention, a feedback capacitor takes the place of the sensing capacitor of the prior art, and the sensing capacitor is moved to the input node of the op amp. Dual inputs drive the circuit, with the input waveforms being of opposite phase with respect to one another. Capacitive values, which are controlled through the physical device embodying the circuit, are selected such that terms contributing to the output voltage attributable to common mode may cancel each other. The circuit output voltage then represents measured capacitance changes, such as when a fingerprint transitions from a valley to a ridge as it slides over the sensor circuit in operation.

While term cancellation is one embodiment of the present invention, other embodiments are contemplated by the present invention. For example, by knowing the relative capacitive values of $C_{in}$ and $C_f$, it is possible to take into account the values of terms attributable to common mode without actually cancelling terms from the voltage calculation. Many different methods of data analysis and circuit design are therefore provided by the present invention.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION OF THE INVENTION

Figure 1:
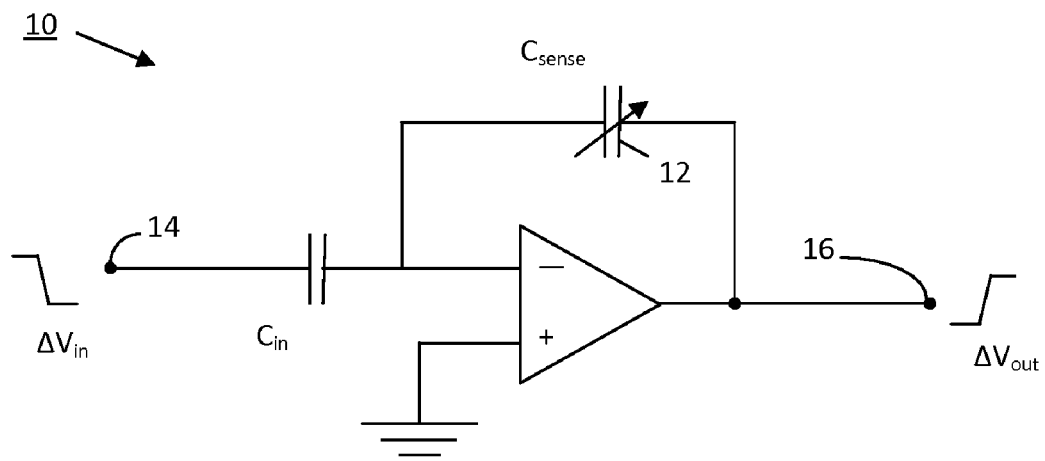
FIG. 1 is a schematic illustration of a circuit for biometric data acquisition according to the prior art.
Figure 2:
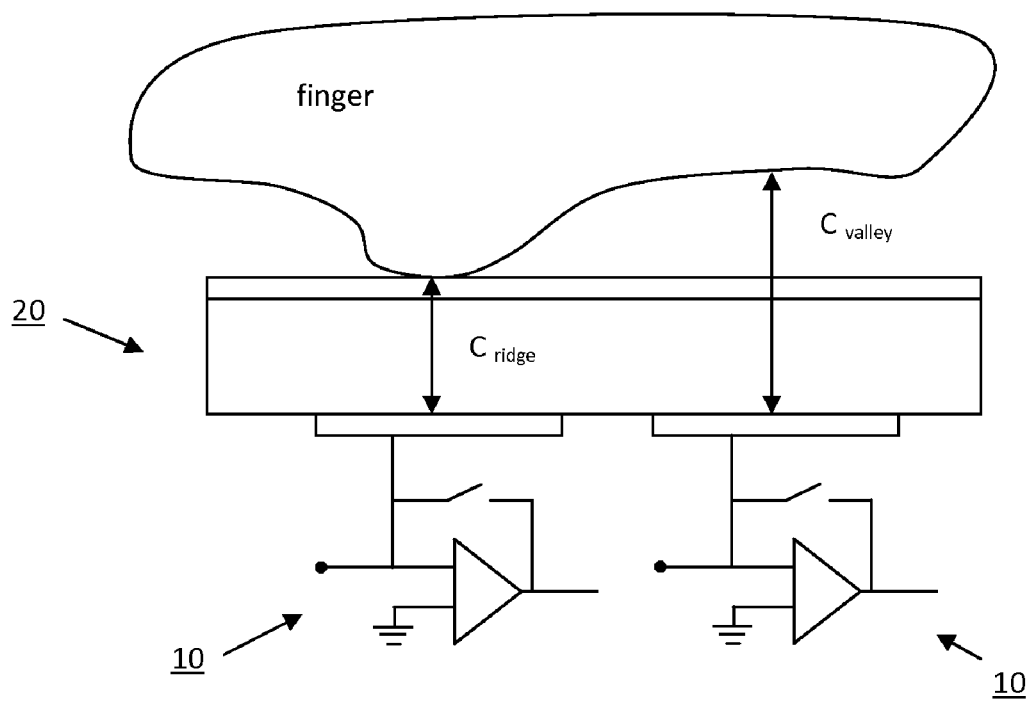
FIG. 2 is a device embodying the circuit of FIG. 1 for biometric data acquisition according to the prior art.
Figure 3:
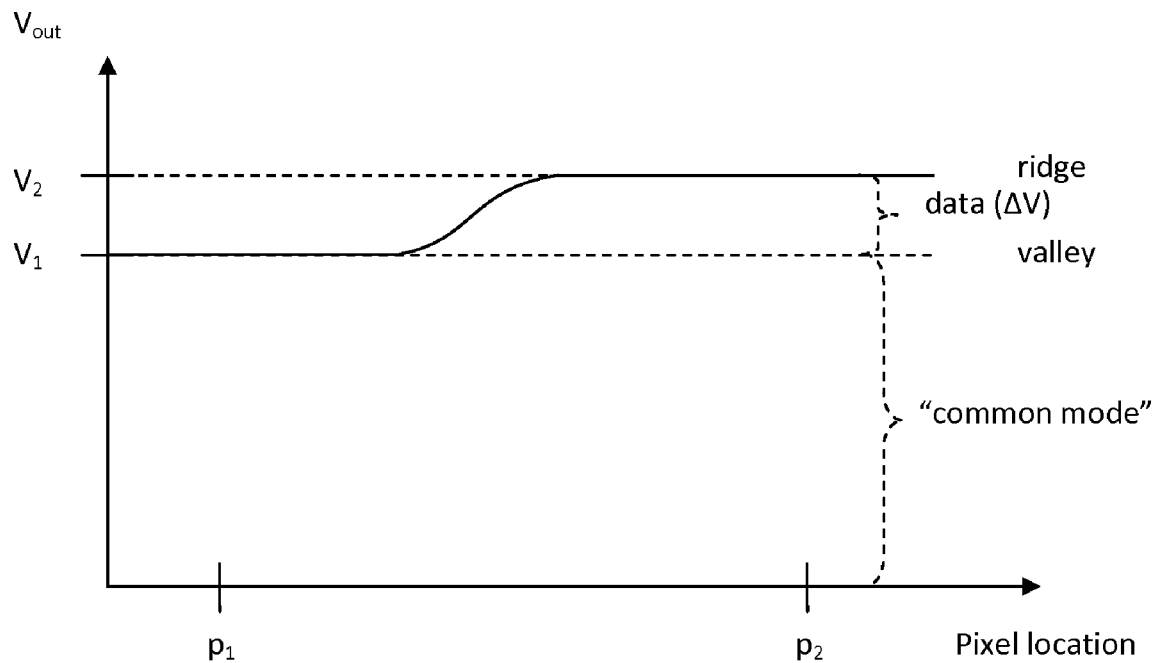
FIG. 3 is a graph of output voltage versus time for a biometric sensing circuit sensing a user's fingerprint, and in particular showing the difference between the sensing of a ridge and a valley of a fingerprint, the common mode, and data from such sensing.
Figure 4:
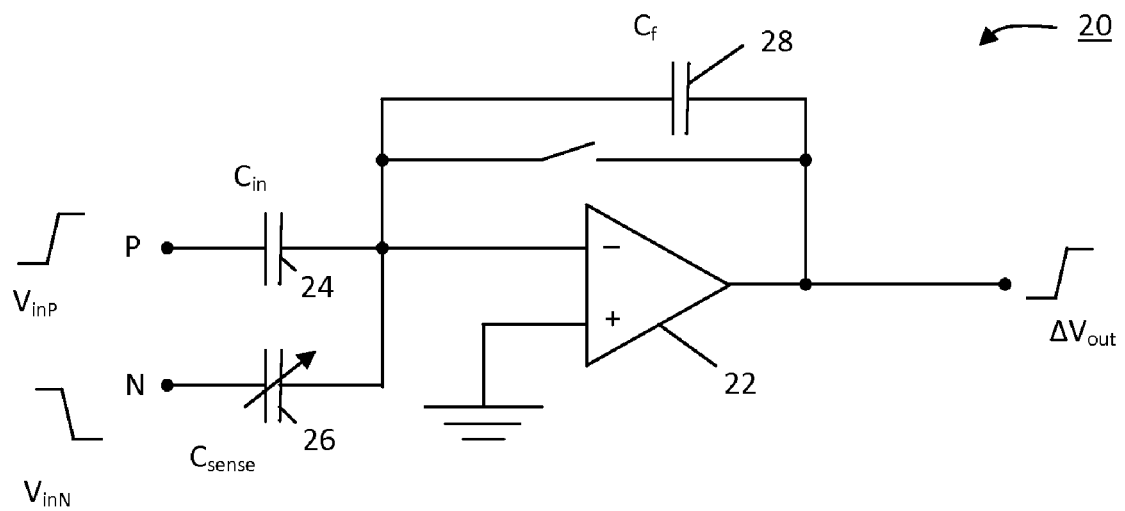
FIG. 4 is a schematic illustration of a circuit for biometric data acquisition according to one embodiment of the present invention.

In order to remove the common mode, we have developed an improved pixel circuit 20, as illustrated in FIG. 4. Pixel circuit 20 comprises an operational amplifier 22 having an input connected to a first capacitor 24, a second capacitor 26 which serves as the sensing capacitor, and a third capacitor 26, which is the feedback capacitance ($C_f$). A charge P is applied to capacitor 24 as $V_{inP}$, and a charge N is applied to capacitor 26 as $V_{inN}$. The magnitudes of charges P and N may be different, but they are essentially of opposite phase with respect to one another.

Again, in terms of $C_{S0}$, the sensing capacitance $C_{sense}$, is given by $$C_{sense} = \begin{cases} C_{S0} \text{ in the absence of a fingerprint ridge } (C_{S0} = C_{sense}) \\ C_{S0(1-\alpha)} \text{ in the presence of a fingerprint ridge (the pixel location } p \text{ typ. approx. } 0.1) \end{cases}$$

In the absence of a fingerprint we obtain $$\Delta v_{out} = -\Delta v_{inP} \cdot \frac{C_{in}}{C_f} + \Delta V_{inN} \cdot \frac{C_{S0}}{C_f} \quad (2)$$

And in the presence of a fingerprint we obtain $$\Delta v_{out} = -\Delta v_{inP} \cdot \frac{C_{in}}{C_f} + \Delta V_{inN} \cdot \frac{C_{S0}}{C_f}(1-\alpha) \quad (3)$$

or $$\Delta v_{out} = -\Delta v_{inP} \cdot \frac{C_{in}}{C_f} + \Delta V_{inN} \cdot \frac{C_{S0}}{C_f} - \Delta V_{inN} \cdot \frac{C_{S0}\alpha}{C_f} \quad (4)$$

Now, we choose the fixed capacitance in the circuit, $C_f$, $C_{S0}$ and $C_{in}$ all to be equal, as well as setting $V_{inP}=V_{inN}$. It will be noted that upon doing so, $$\Delta V_{inP} \cdot \frac{C_{in}}{C_f} = \Delta V_{inN} \cdot \frac{C_{S0}}{C_f} \quad (5)$$

Therefore, due to the negative sign in equation (2), the first two terms cancel one another, leaving $$\Delta v_{out} = -\Delta V_{inN} \cdot \frac{C_{S0}\alpha}{C_f} \quad (6)$$

The right side of equation (6) is simply the contribution to the output signal due to the presence of the ridge—the data we were originally interested in viewing from the sensing circuit. Accordingly, we have cancelled the "common mode" (the part of the output signal due to noise) and left as the output signal only the data of interest.

Figure 5:
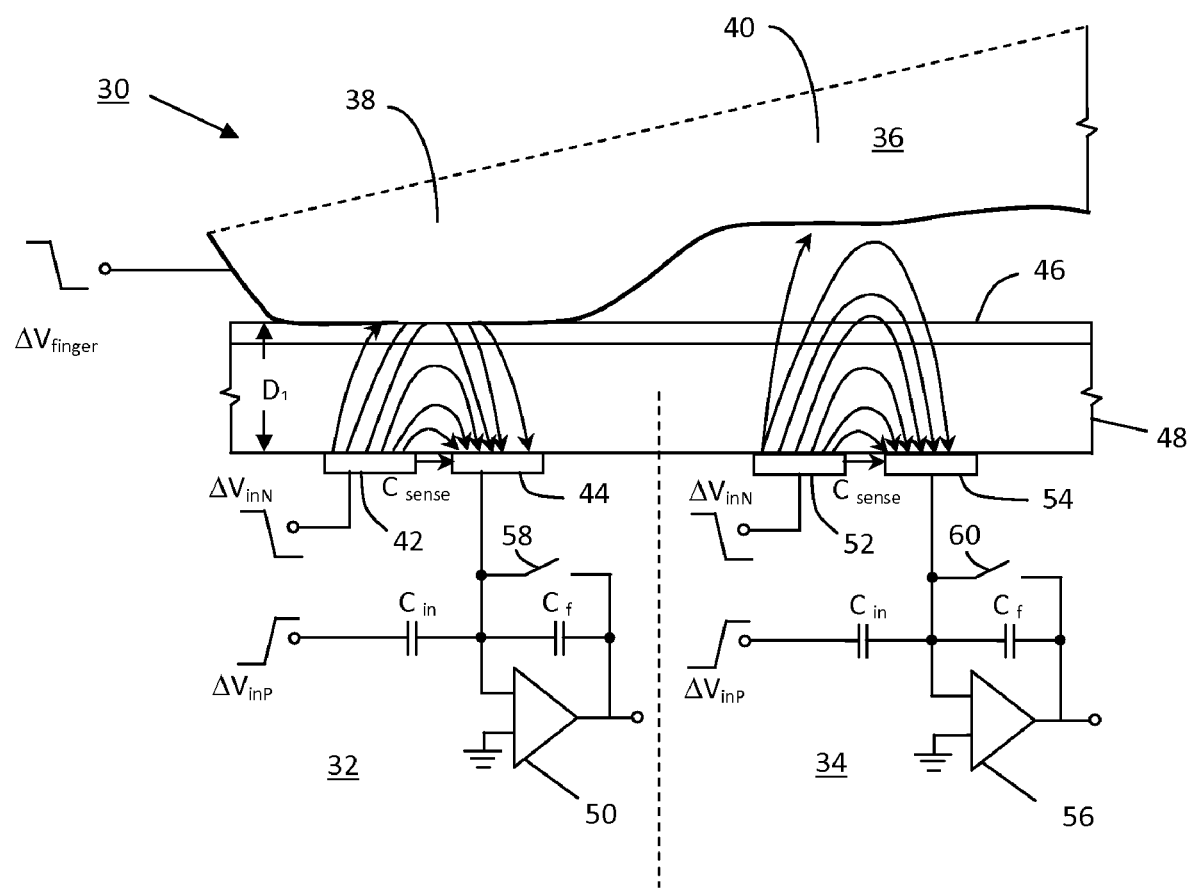
FIG. 5 is a combined cross section and schematic view of a biometric data acquisition device, such as a fingerprint sensor, showing placement of a user's finger thereover, according to an embodiment of the present invention.

FIG. 5 is an illustration of one embodiment 30 of a fingerprint sensor device according to the present invention. FIG. 5 shows two sensor cells 32, 34 which are spaced from each other as might typically be implemented in an array of such sensor cells. For ease of illustration, the first cell 32 is shown with a ridge region of a finger 36 directly thereover, whereas the second cell 34 is shown with a valley region of a finger 36 directly thereover so that the differences in operation can be easily explained and understood.

Concerning first the situation in which a ridge portion 38 of a fingerprint pattern borne by the finger 36 is directly over a cell 32, the distance between the fingerprint surface (i.e., user's skin) and upper surfaces of first and second capacitor plates 38, 40 is $D_1$, since the skin is in direct contact with the upper surface 42 of the sensor body structure 44. In this instance, the effect of the ridge portion 38 of the fingerprint pattern borne by the finger 36 is to reduce the value of the fringe capacitance between plates 42 and 44. In particular, the capacitance between plates 42 and 44 is shown by the fringe field lines with fewer field lines illustrating a reduction in the capacitance value. Namely, since the ridge 38 is close to the plates 42 and 44, some of the field lines are interfered with by the ridge portion 38 so that the overall capacitance value between plates 42 and 44 is reduced due to the fringing effect of an adjacent conductor. This is represented by some of the field lines going into the finger 36 rather than extending between capacitor plate 42 and 44.

Concerning the second situation in which a valley portion 40 of a fingerprint pattern borne by the finger 36 is directly over a cell 34, the distance between the fingerprint surface (i.e., user's skin) and upper surfaces of first and second capacitor plates 52, 54 is $D_2$. Taking the case in which $D_2$ is relatively large, there will be little or no interference between the fringe capacitive field lines that extend between the plates 52 and 54 of the feedback capacitor to the amplifier 56 of cell 34. In particular, most or all of the fringe field lines which existed between plates 52 and 54 still exist when the valley is adjacent the cell such that the finger does not interfere with the fringe capacitance value in any significant way.

As detailed in the aforementioned U.S. Pat. No. 6,512,381, the actual local capacitance of each individual cell 32, 34 will not be precisely known, and will vary over a wide range. However, with $C_f$ and $C_{in}$ both fixed, the sense capacitance $C_{sense}$ will be at a minimum value while at a ridge portion with the skin in direct contact with the upper surface 46 of sensor structure 48. The sense capacitance $C_{sense}$ will increase as the skin moves away from plates 42, 44 (or similarly 52, 54), and be at a maximum value in the presence of a valley portion of a fingerprint. Since the fingerprint pattern of an individual varies between ridge and valleys, it will be appreciated that the actual sense capacitance will also vary from the two extremes of the minimum and maximum value.

The present invention provides many advantages over prior art original single-ended capacitance sensing pixel circuit architectures, including:
  a) The output signal represents (ideally) only the real gain modulation due to a user's finger's ridges and valleys (rather than the presence of the finger);
  b) The output dynamics of the circuit are utilized more efficiently (improving the signal-to-noise ratio) and enables the use of this circuit with low power supplies;
  c) The circuit is very simple and its timing requirements are minimal (therefore, the transistor matching tolerance can be increased, and the statistical offset can be reduced);
  d) Only the input capacitances need be matched; and
  e) The components of this design are well known in the art and are readily implemented using existing integrated circuit fabrication techniques.

The physics of modern electrical devices and the methods of their production are not absolutes, but rather statistical efforts to produce a desired device and/or result. Even with the utmost of attention being paid to repeatability of processes, the cleanliness of manufacturing facilities, the purity of starting and processing materials, and so forth, variations and imperfections result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

Furthermore, while a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A capacitive sensing pixel for a biometric data detection system, comprising:
   a first conductor supported by a semiconductor substrate;
   a second conductor supported by said semiconductor substrate, said first and second conductors being spaced apart from each other;
   a first reference voltage source providing a first input voltage having a first phase;
   a second reference voltage source providing a second input voltage having a second phase substantially opposite to said first phase;
   an inverting amplifier having an input and output;
   an input capacitor connected between said first reference voltage source and said input of said inverting amplifier;
   said first and second conductors forming at least a portion of a sensing capacitor connected between said second reference voltage source and said input of said inverting amplifier; and
   a feedback capacitor connected between said input and said output of said inverting amplifier.

2. The capacitive sensing pixel of claim 1, further comprising a switch connected between said input and said output of said inverting amplifier for resetting said sensing pixel.

3. An array of capacitive sensing pixels of the type used for sensing the pattern of a user's fingerprint, comprising:
   a substrate;
   a plurality of pixel cells formed on said substrate, each said pixel cell comprising:
     a first conductor supported by said substrate;
     a second conductor supported by said substrate, said first and second conductors being spaced apart from each other;
     a first reference voltage source providing a first input voltage having a first phase;
     a second reference voltage source providing a second input voltage having a second phase substantially opposite to said first phase;
     an inverting amplifier having an input and output;
     an input capacitor connected between said first reference voltage source and said input of said inverting amplifier;

said first and second conductors forming at least a portion of a sensing capacitor connected between said second reference voltage source and said input of said inverting amplifier; and a feedback capacitor connected between said input and said output of said inverting amplifier.

4. The array of capacitive sensing pixels of claim 3, wherein each pixel cell further comprises a switch connected between said input and said output of said inverting amplifier for resetting said sensing pixel.

5. A method of obtaining improved image data in a fingerprint sensor, comprising:

providing an array of capacitive-type fingerprint sensor cells in which a change in output voltage, Δvout, represents data indicating the presence of a valley or a ridge of a fingerprint thereover, and wherein in each said cell Δvin is a changing input voltage to the cell, ΔvinN and ΔvinP are changing input voltages to the cell with substantially the same magnitude as Δvin but such that ΔvinN and ΔvinP are substantially out of phase with respect to each other, Cin is the capacitance at the input to the cell, Cf is the capacitance of a feedback capacitor within the cell, CS is a variable sensing capacitance within the cell which changes in the presence or absence of a fingerprint over the cell, and CS0 is CS immediately following a reset of the cell, and further wherein:

in the presence of a valley of a fingerprint Δvout is substantially given by $$\Delta v_{out} = -\Delta v_{in} \cdot \frac{C_{in}}{C_f} + \Delta V_{in} \cdot \frac{C_{S0}}{C_f}$$

and in the presence of a ridge of a fingerprint Δvout is substantially given by $$\Delta v_{out} = -\Delta v_{in_P} \cdot \frac{C_{in}}{C_f} + \Delta V_{in_N} \cdot \frac{C_{S0}}{C_f} - \Delta V_{in_N} \cdot \frac{C_{S0}\alpha}{C_f}$$

providing said sensor circuit such that each of said Cf, CS0, and Cin are substantially equal in value such that $$\Delta v_{out} = -\Delta V_{in_N} \cdot \frac{C_{S0}\alpha}{C_f}$$

obtaining, from each said cell, image data corresponding to a portion of a user's fingerprint;

whereby said data represent an image of a portion of said user's fingerprint having contributions due to a common mode of the array removed therefrom.

* * * * *